United States Patent
Yokota et al.

(10) Patent No.: US 7,437,478 B2
(45) Date of Patent: Oct. 14, 2008

(54) PRIORITY CONTROL DEVICE

(75) Inventors: Daisuke Yokota, Yokohama (JP); Fumio Noda, Kodaira (JP); Yasuhiro Takahashi, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 679 days.

(21) Appl. No.: 10/933,242

(22) Filed: Sep. 3, 2004

(65) Prior Publication Data

US 2006/0036764 A1     Feb. 16, 2006

(30) Foreign Application Priority Data

Jul. 12, 2004     (JP)     ............................. 2004/204059

(51) Int. Cl.
    *G06F 15/173*     (2006.01)
(52) U.S. Cl. ....................................... 709/240; 709/238
(58) Field of Classification Search ................. 709/240, 709/238; 370/229
See application file for complete search history.

(56) References Cited

U.S. PATENT DOCUMENTS 6,018,515 A * 1/2000 Sorber ......................... 370/229
6,415,313 B1   7/2002 Yamada et al.

\* cited by examiner

*Primary Examiner*—Jason Cardone
*Assistant Examiner*—Adnan M Mirza
(74) *Attorney, Agent, or Firm*—Antonelli, Terry, Stout & Kraus, LLP.

(57) ABSTRACT

When a client-server system that adopts a Web service featuring dynamic connection among different systems is constructed, an existing priority control device therein disconnects communication with lower priority, at the time of server overload that continues for several hours. Thus, the availability of the system is reduced. A client-server Web service system includes a unit for interpreting communication protocols at a protocol layer 4 used in the system, a unit for receiving requests transmitted from clients to a server, for buffering, a unit for analyzing the protocol type, the destination, and the communication contents of each of the requests, a unit for converting the result of the analysis into a priority, and a unit for transmitting the buffered requests to the server based on the priority and then transmitting to the clients responses from the server.

18 Claims, 6 Drawing Sheets

FIG. 3

REQUEST BUFFER 13

| DATA IDENTIFIER 110 | RECEIVED DATA 111 | PROTOCOL TYPE 112 | RECEIVED TIME 113 | ALLOWABLE DELAY TIME 114 | USED DELIVERY RULE IDENTIFIER 115 |
|---|---|---|---|---|---|
| 1 | | | | | | 116-1
| 2 | | | | | | 116-2
| 3 | | | | | | 116-3
| --- | | | | | |

FIG. 4

DELIVERY RULE TABLE 14

| DELIVERY RULE IDENTIFIER 120 | PRIORITY KEYWORD 121 | PRIORITY PROTOCOL TYPE 122 | MAXIMUM ALLOWABLE DELAY TIME 123 | ALLOWABLE SERVER LOAD 124 | DELIVERY DESTINATION SERVER ADDRESSES 125 |
|---|---|---|---|---|---|
| 1 | | | | | | 126-1
| 2 | | | | | | 126-2
| 3 | | | | | | 126-3
| --- | | | | | |

REQUEST RECEIVING UNIT PROCESSING FLOW

SORTING UNIT PROCESSING FLOW

REQUEST PROCESSING UNIT PROCESSING FLOW

MESSAGE FLOW DIAGRAM ual method for the contents of communication, dynamic connection to a new trading partner could not be established, so that order placement and acceptance operations could not be automated. The web service solves the problem described above: the web service does not define the type of a communication procedure (which will be hereinafter referred to as a protocol type) at the protocol layer 4 between the server and each of the clients connected through the TCP/IP network, assumes and permits use of a plurality of protocols such as use of both of the HTTP protocol and the SMTP protocol, shares the format for the contents of communication in the XML (extensible Markup Language), and releases the notational method on the Internet, thereby ensuring dynamic connectivity among different systems.

PRIORITY CONTROL DEVICE

INCORPORATION BY REFERENCE

This application claims priority based on a Japanese patent application, No. 2004-204059 filed on Jul. 12, 2004, the entire contents of which are incorporated herein by reference.

BACKGROUND OF THE INVENTION

The present invention relates to a technology that enables high availability of a client-server system at the time of overload, by priority control processing.

In recent years, client-server systems using Web services have begun to be constructed for use in business transactions between companies that require high availability.

The web service is a new form of application system: by connecting a server to clients of separately-constructed different systems, the web service is constructed. In other order placement and acceptance systems in companies except for the system built as the web service, for example, due to a difference in the communication protocol or the notational On the other hand, in conventional client-server systems, there is known a technology for installing a priority control device between the server and the clients. This technology is disclosed in U.S. Pat. No. 6,415,313, for example. By installing the priority control device, even at the time of server overload, the server can respond to a request from an important client. The request from a client will be referred to as a request message. The priority control device prioritizes request messages from clients, causes the request messages with lower priorities to be waited for transmission, and relays the request messages to the server sequentially in the order of the priorities of the request messages.

SUMMARY OF THE INVENTION

When a client-server system using the Web service that dynamically connects different systems is constructed, the priority control device described in the above-mentioned U.S. Pat. No. 6,415,313 causes a problem: when server overload continues for several hours, communication with lower priority is disconnected, so that system availability is reduced.

Specifically, since relay processing on communication between the clients and the server is managed for each IP packet, priority control can be performed only within the delay time of several minutes allowed for each IP packet. More specifically, the priority control device analyzes a request message from a client and determines the priority of the request message. Then, the priority control device prioritize IP packets constituting the request message, and transmits IP packets with higher priority to the server, with the IP packets with lower priority waited for transmission. In the TCP/IP network, if a response to an IP packet is delayed by about several minutes, the clients or the server determines that there is no response to the IP packet and disconnects communication. Thus, at the time of server overload that continues for several hours, communication of a request message with lower priority is disconnected.

Accordingly, a more improved priority control device has been demanded.

In some of the protocols such as the SMTP protocol used for electronic mails, once a request message has been received and a receive procedure for protocol processing using the SMTP protocol has been completed (which will be hereinafter referred to as terminated), no problem associated with the protocol is generated even if several hours are used for waiting for a response to the request message.

The present invention provides a technique for receiving request messages from clients respectively using a plurality of protocols employed in the Web service or the like, and then temporarily terminating protocol processing on the request messages.

The present invention further provides a technique for prioritizing request messages from a plurality of clients collectively, irrespective of protocols used for the request messages, and scheduling relaying of the request messages within the times allowable for the respective protocol types.

According to the present invention, the conventional problem of communication disconnection due to a delay in the response to an IP packet is solved.

Further, according to the present invention, priority control considering the characteristic of each protocol becomes possible: under the priority control according to the present invention, when request messages using the SMTP protocol and the HTTP protocol, sent from a plurality of clients are received, for example, request messages sent with the SMTP protocol are relayed to the server after several hours of server overload is finished.

In the client-server system of the present invention, which employs the Web service that dynamically connects different systems, improvement in the availability of the system at the time of server high load becomes possible.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 3 is a table showing a configuration of a request buffer 13 in the priority control device 3 in the embodiment of the present invention;

FIG. 4 is a table showing a configuration of a delivery rule table 14 in the priority control device 3 in the embodiment of the present invention;

DETAILED DESCRIPTION OF THE EMBODIMENTS

An embodiment of the present invention will be described below with reference to the appended drawings.

Figure 1:
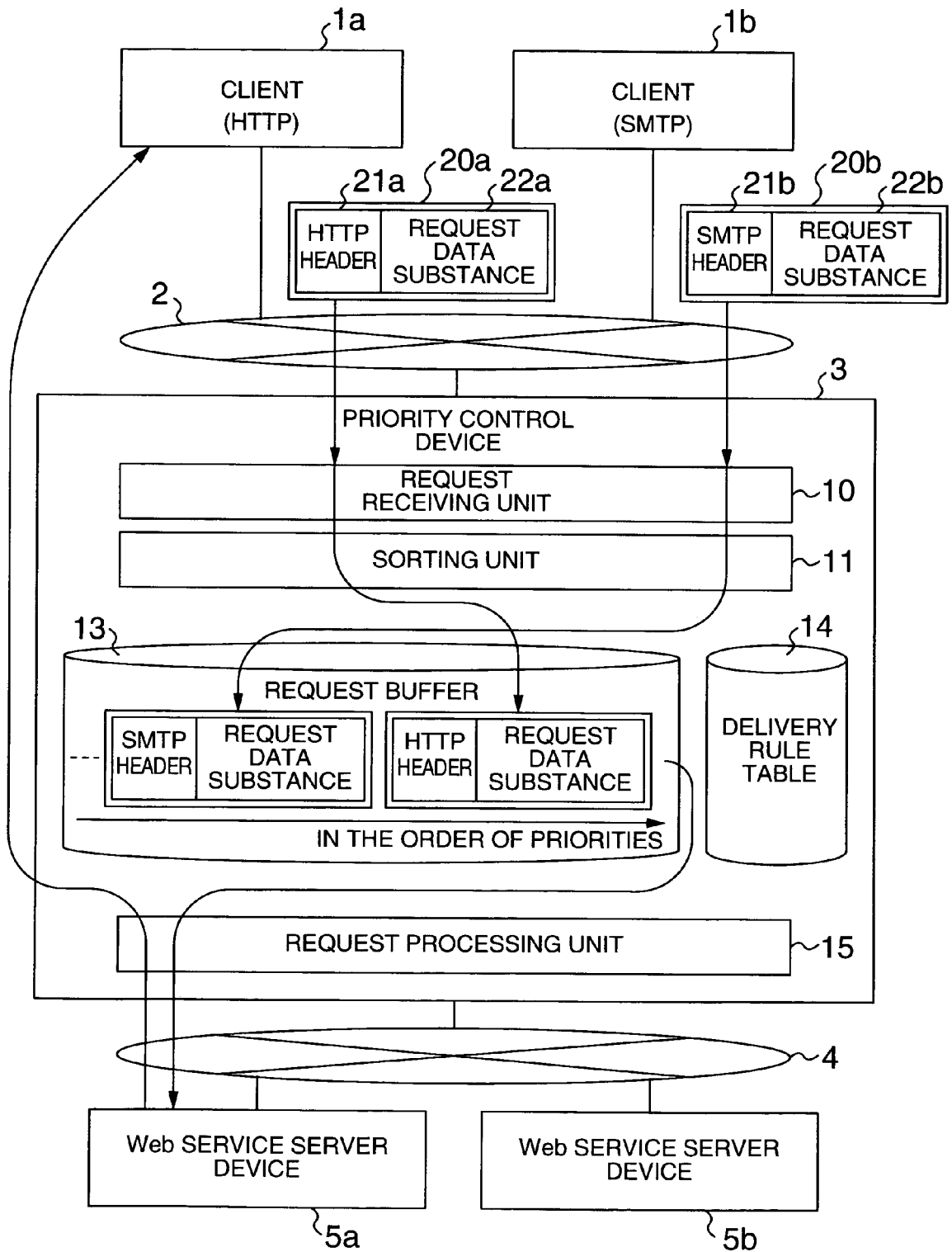
FIG. 1 is a diagram schematically showing a configuration and an operation of a network system that uses a priority control device 3 according to an embodiment of the present invention.

FIG. 1 shows a schematic configuration of a client-server system to which a priority control device in this embodiment is applied.

Client terminals 1a and 1b are connected to a priority control device 3 through an IP network 2 for the Internet and the like. Each client terminal will be hereinafter referred to as a client. The priority control device 3 is connected to Web service server devices 5a and 5b through an IP network 4.

In this embodiment, it is assumed that the client 1a transmits a request message 20a to the Web service server device 5a through the IP network 2, priority control device 3, and IP network 4, and receives a response from the Web service server device 5a through the IP network 4, priority control device 3, and IP network 2. It is also assumed that the client 1b uses the SMTP protocol as the protocol and performs communication, using a request message 20b in the same manner as the client 1b.

A following description will be given about the request message 20a transmitted from the client 1a to the Web service server device 5a and the request message 20b transmitted from the client 1b to the Web service server device 5b, for convenience. In this system, either of the request messages 20a and 20b may be employed, and any protocol other than the ones shown in this embodiment may also be employed.

The request message 20a uses the HTTP protocol as the protocol, and is constituted from an HTTP header 21a and a request data substance 22a. The HTTP header 21a stores information required for communication with the HTTP protocol. In the request data substance 22a, the content requested for processing by the server is written in the XML. Likewise, the request message 20b uses the SMTP protocol as the protocol, and is constituted from an SMTP header 21b and a request data substance 22b. The SMTP header 21b stores information required for communication with the SMTP protocol. In the request data substance 22b, the content requested for processing by the server is written in the XML.

The priority control device 3 is constituted from a request receiving unit 10, a sorting unit 11, a request buffer 13, a delivery rule table 14, and a request processing unit 15.

Figure 2:
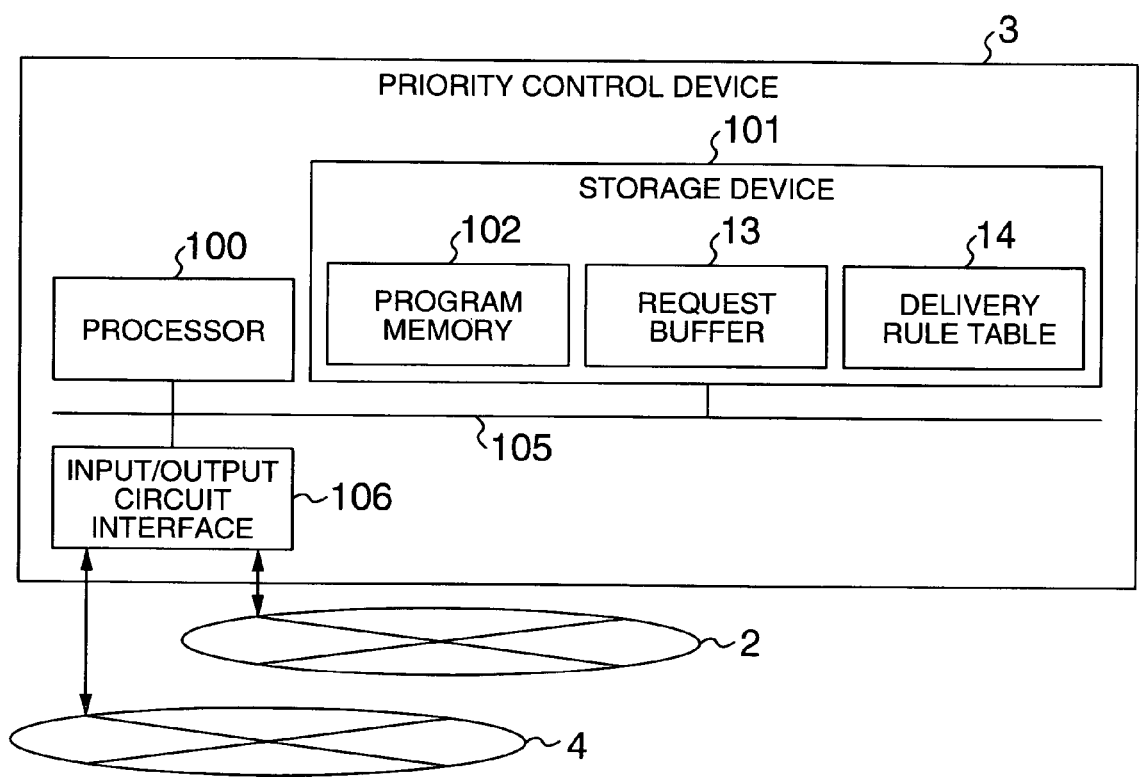
FIG. 2 is a diagram showing a configuration of the priority control device 3.

FIG. 2 shows a hardware configuration of an information processing device implementing the priority control device 3. The information processing device implementing the priority control device 3 is constituted from a processor 100, a storage device 101, an input/output circuit interface 106 for establishing connection to the IP networks 2 and 4, and internal communication lines such as a bus 105 for connection of these devices. The storage device 101 includes regions of a program memory 102 and the request buffer 13, and stores the delivery rule table 14. Various programs for implementing processing units in the priority control device 3 by the processor 100 are recorded in the program memory 102. Request messages received from the clients 1a and 1b and to be relayed to the Web service server devices 5a and 5b are stored in the request buffer 13. The storage device 101 is constituted from a semiconductor memory device or an external memory device such as a hard disk.

The programs described above may be stored in the storage device 101 in advance. Alternatively, the programs may be installed in the storage device 101 through a detachable storage medium or a communication medium not shown, as necessary. The communication medium includes a network or a digital signal or a carrier wave which propagates each of the programs.

Though the priority control device 3 may include an input device and a display device for enabling data input by a system manager, these devices are omitted in FIG. 2.

FIG. 3 shows a configuration of the request buffer 13 in the priority control device 3.

The request buffer 13 includes entries 116-1, 116-2, and 116-3, and so on for respective received request messages. Each entry is constituted from a data identifier 110, received data 111, a protocol type 112, a received time 113, an allowable delay time 114, and a used delivery rule identifier 115.

A unique identifier for identifying each entry is given to the data identifier 110. The request message 20a or 20b transmitted from the client 1a or 1b, respectively is stored in the received data 111. The protocol used for the request message 20a or 20b, such as the HTTP protocol or the SMTP protocol is stored in the protocol type 112. In the received time 113, the time at which the priority control device 3 has received the request message 20a or 20b is stored. In the allowable delay time 114, the allowable latest time for transmission to the Web service server device 5a or 5b obtained from the result of analysis of the request message 20a or 20b is recorded. The analysis is performed by referring to the delivery rule table 14 and obtaining an appropriate rule used for priority control. In the used delivery rule identifier 115, a delivery rule identifier 120 on the delivery rule table 14 for identifying the entry used for calculation of the allowable delay time 114 is recorded.

FIG. 4 shows a configuration of the delivery rule table 14 provided for the priority control device 3.

The delivery rule table 14 includes entries 126-1, 126-2, or 126-3 for each protocol, for example. Each entry is constituted from the delivery rule identifier 120, a priority keyword 121, a priority protocol type 122, a maximum allowable delay time 123, an allowable server load 124, and delivery destination server addresses 125.

The delivery rule table 14 stores priority control rules used for relaying the request message 20a and 20b received by the priority control device 3. The delivery rule table 14 is set by the system manager.

A unique identifier for identifying each entry is given to the delivery rule identifier 120. The priority keyword 121 stores a keyword included in the request data substance 22a or 22b for which priority should be given. The priority protocol type 122 stores the protocol used for the request message 20a or 20b for which priority should be given. The maximum allowable delay time 123 stores the maximum delay time allowable when the request message 20a or 20b that has been determined to include the keyword matching the priority keyword 121 and the protocol matching the priority protocol type 122 is transmitted to the Web service server device. The allowable server load 124 stores the maximum load allowable by the Web service server device 5a or 5b when the request message 20a or 20b is transmitted to the Web service server device 5a or 5b. Incidentally, for calculation of the allowable server load 124, a parameter such as the CPU usage ratio, the number of connections, or the average response time, with which loads can be measured, is used. One or more arbitrary parameters may be combined for use if they can be obtained by the priority control device 3. The delivery destination addresses 125 stores an IP address for the Web service server device 5a or 5b to which the request message 20a or 20b should be transmitted. The IP address for the Web service server device 5a or 5b is an identifier on the IP network 4. One IP address or a plurality of IP addresses may be stored in the delivery destination addresses 125 for each Web service server device. When the plurality of IP addresses are used, one of the IP addresses that satisfies the criteria for the allowable server load 124 is finally employed, through an appropriate algorithm such as a round robin algorithm.

Figure 5:
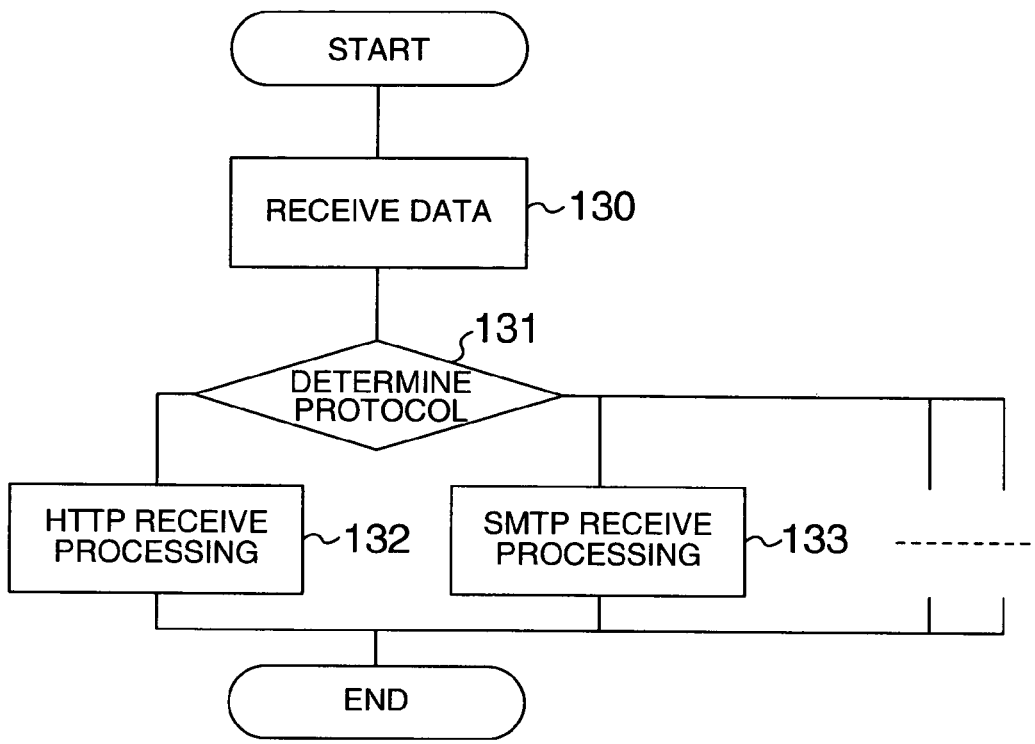
FIG. 5 is a flowchart showing a processing flow of a request receiving unit 10 implemented by the priority control device 3.

An operation of the request receiving unit 10 will be described, using a flowchart shown in FIG. 5.

The request receiving unit 10 of the priority control device 3 receives the request message 20a or 20b from the client 1a or 1b, respectively, at step 130. Then, the request receiving unit 10 analyzes the HTTP header 21a or SMTP header 21b to determine the protocol for the request message 20a or 20b at step 131, and performs receive processing according to the protocol at step 132 or 133. Since specifications for the steps for the receive processing are strictly determined for each protocol, only an overview of the receive processing steps for each protocol will be described.

In the HTTP protocol, for example, a request for a TCP/IP connection is transmitted from the client 1a to the priority control device 3. Then, after the connection is established, the TCP/IP connection is held from transmission of the request message 20a to the priority control device 3 until return of a response for the request message 20a from the priority control device 3 to the client 1a.

On the other hand, in the SMTP protocol, for example, a request for the TCP/IP connection is transmitted from the client 1b to the priority control device 3. Then, after the connection is established, a command shorter than the request message 20a, transmitter information and transmission destination information included in the SMTP header 21b, the request data substance 22b, and the like are transmitted to the priority control device 3 one by one. The priority control device 3 notifies to the client 1b that these data and the command could be received. Then, the priority control device 3 disconnects the TCP/IP connection before returning the response for the request message 20b to the client 1b.

If other protocol except for the HTTP protocol and the SMTP protocol needs to be used, associated receive processing may be added and installed.

As pointed out in the above-mentioned example, if the TCP/IP connection can be disconnected for each communication protocol, by temporarily disconnecting the TCP/IP connection, priority control over a longer period than with the prior art becomes possible.

Figure 6:
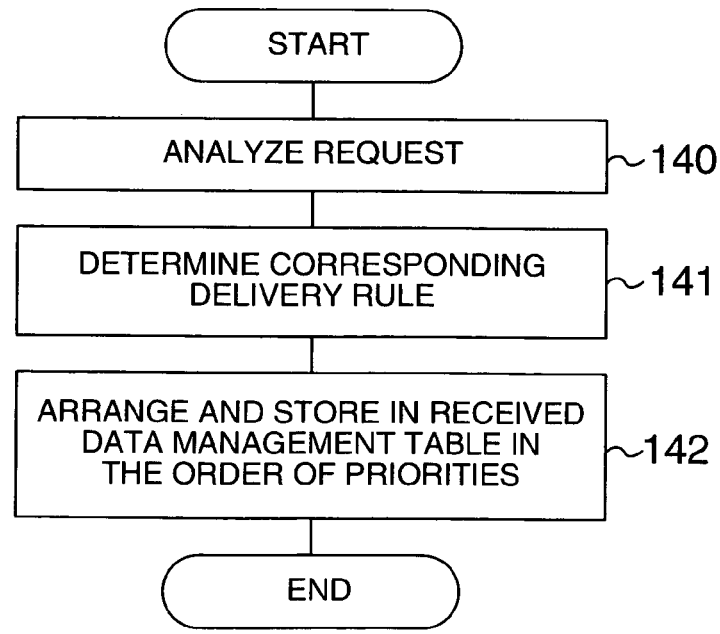
FIG. 6 is a flowchart showing a processing flow of a sorting unit 11 implemented by the priority control device 3.

An operation of the sorting unit 11 that prioritizes request messages will be described with reference to a flowchart shown in FIG. 6.

The sorting unit 11 of the priority control device 3 stores the request messages 20a and 20b received by the request receiving unit 10 in the request buffer 13. Since the request data substances 22a and 22b of the received request messages 20a and 20b are expressed in the XML, the sorting unit 11 performs syntactic analysis according to the description format of the XML so as to utilize semantic information such as XML element names and XML element values as well, at step 140. Incidentally, if the priority keyword 121 is not set in the delivery rule table 14, this processing may be omitted.

Next, the sorting unit 11 determines whether the request messages 20a and 20b match the condition in the entries 126-1, 126-2, 126-3, or so on, from top to bottom in the delivery rule table 14, and selects the delivery rules governing the conditions the request messages 20a and 20b have matched first, at step 141. Prioritization of the delivery rules in the delivery rule table 14 may be arbitrarily performed by the system manager. The prioritization may be set in the order of importance of responses to requests, for example. Further, for match determination, it is required that the priority keyword 121 be included in each of the request data substances 22a and 22b of which syntactic analysis has been performed at step 140, and that each of the protocols used for the request messages 20a and 20b match the priority protocol type 122. For determination of a match between the priority keyword 121 and the keyword included in each of the request data substances 22a and 22b, the semantic information which has undergone the syntactic analysis may also be employed. More specifically, a matching condition as follows may be set, for example: the name of an element in the request data substance should be a certain character string or a pair of the name of an element and the value of the element in the request data substance should match the set value. Further, a plurality of criterion may be stored in the priority keyword 121, and a matching condition that the request data substance include any one of the criteria, all of the criteria, or none of the criteria may be set.

Next, the sorting unit 11 adds the maximum allowable delay time 123 to the current time, thereby calculating the allowable delay time 114 for each of the request messages 20a and 20b, using the delivery rules selected at step 141. Then, the sorting unit 11 prioritizes the request messages 20a and 20b in the order in which the allowable delay times of the request messages are closer to the current time, and data on the request messages 20a and 20b are stored in the corresponding entries in the request buffer. More specifically, the request messages 20a and 20b are stored in the fields of the received data 111 of the corresponding two of the entries 116-1, 116-2, 116-3, the protocol used for each of the request messages 20a and 20b is stored in the field of the protocol 112, the current time is stored in the field of the received time 113, each of the results of the calculation is stored in the field of the allowable delay time 114, and each of the delivery rule identifiers for the respective delivery rules determined at step 141 is stored in the field of the used delivery rule identifier 115, at step 142.

Figure 7:
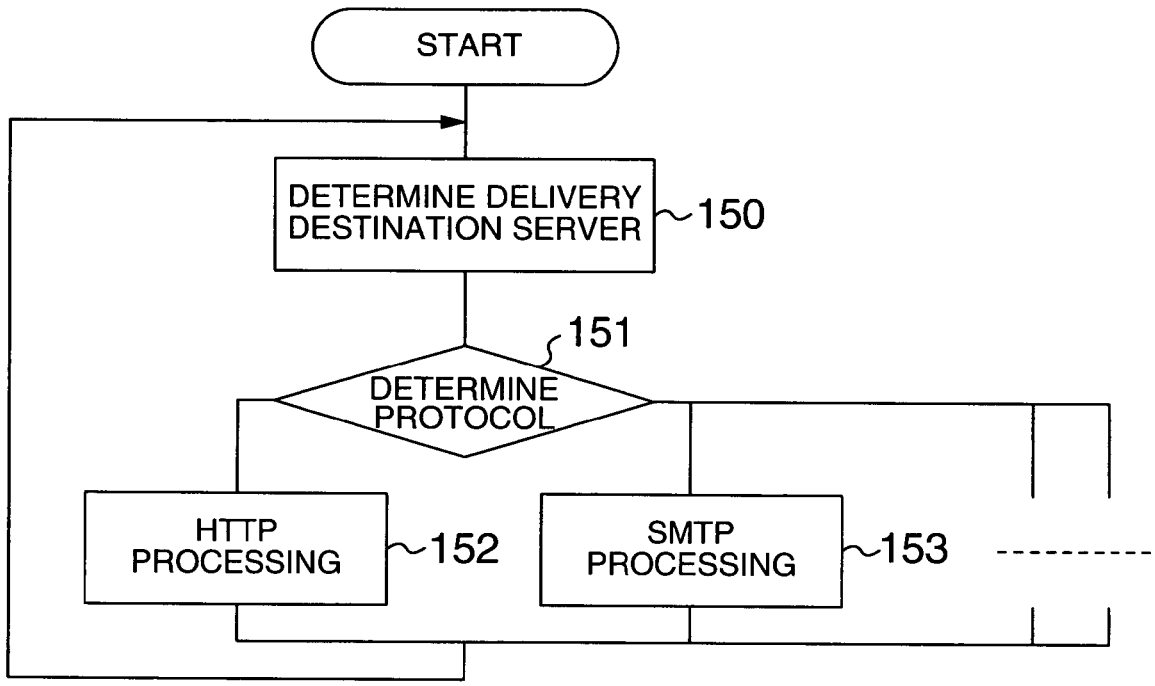
FIG. 7 is a flowchart showing a processing flow of a request processing unit 15 implemented by the priority control device 3.

FIG. 7 is a flowchart showing the algorithm of the request processing unit 15.

The request processing unit 15 of the priority control device 3 checks all entries in the request buffer 13 sequentially from the highest order, or in the order in which the allowable delay times of the entries are closer to the current time, and determines the request messages to be transmitted to the Web service server device 5a or 5b. Specifically, based on the used delivery rule identifier 115 of the entry in the request buffer 13 corresponding to a request message, the request processing unit 15 obtains the allowable server load 124 and the delivery destination server addresses 125 of the corresponding entry in the delivery rule table 14. Then, the request processing unit 15 obtains the load on the Web service server device 5a or 5b specified by the IP address for the Web service server stored in the field of the delivery destination server addresses 125. If the load on the Web service server is below the allowable server load 124, the request processing unit 15 determines the request message corresponding to the entry in the request buffer 13 to be transmitted and determines the Web service server with the load obtained as the delivery destination, at step 150.

At this point, if the load obtained is equal to or more than the allowable server load 124, the request processing unit 15 suspends the delivery. If the allowable delay time 114 is past the current time at this point, the request processing unit 15 discards the entry in the request buffer 13. Then, the request processing unit 15 checks the entry in the next order in the request buffer 13. No limitation is imposed on the method of obtaining the load on the Web service server device 5a or 5b. In order to obtain the load on the Web service server device 5a or 5b, the demon program may be run on the Web service server device 5a or 5b, for example, to allow reference to the parameter such as the CPU usage ratio or the like through the IP network, and then the priority control device 3 may refer to the parameter. Alternatively, the load on the Web service server device 5a or 5b may be estimated from the amount of communication between the priority control device 3 and the Web service server device 5a or 5b.

Then, the request processing unit 15 determines the protocol for the request message 20a or 20b of which transmission has been determined, using the protocol type 112, at step 151. Then, the request processing unit 15 transmits the request message 20a or 20b to the Web service server device 5a or 5b determined at step 150 according to the determined protocol, and relays the response from the Web service server device 5a or 5b to the client 1a or 1b at step 152 or 153. Since specifications for this relaying procedure are strictly determined for each protocol, details of the relaying procedure will be omitted. If other protocol except for the HTTP protocol and the SMTP protocol needs to be employed, associated receive processing may be additionally installed.

The effect of this embodiment will be described with reference to the drawing.

Figure 8:
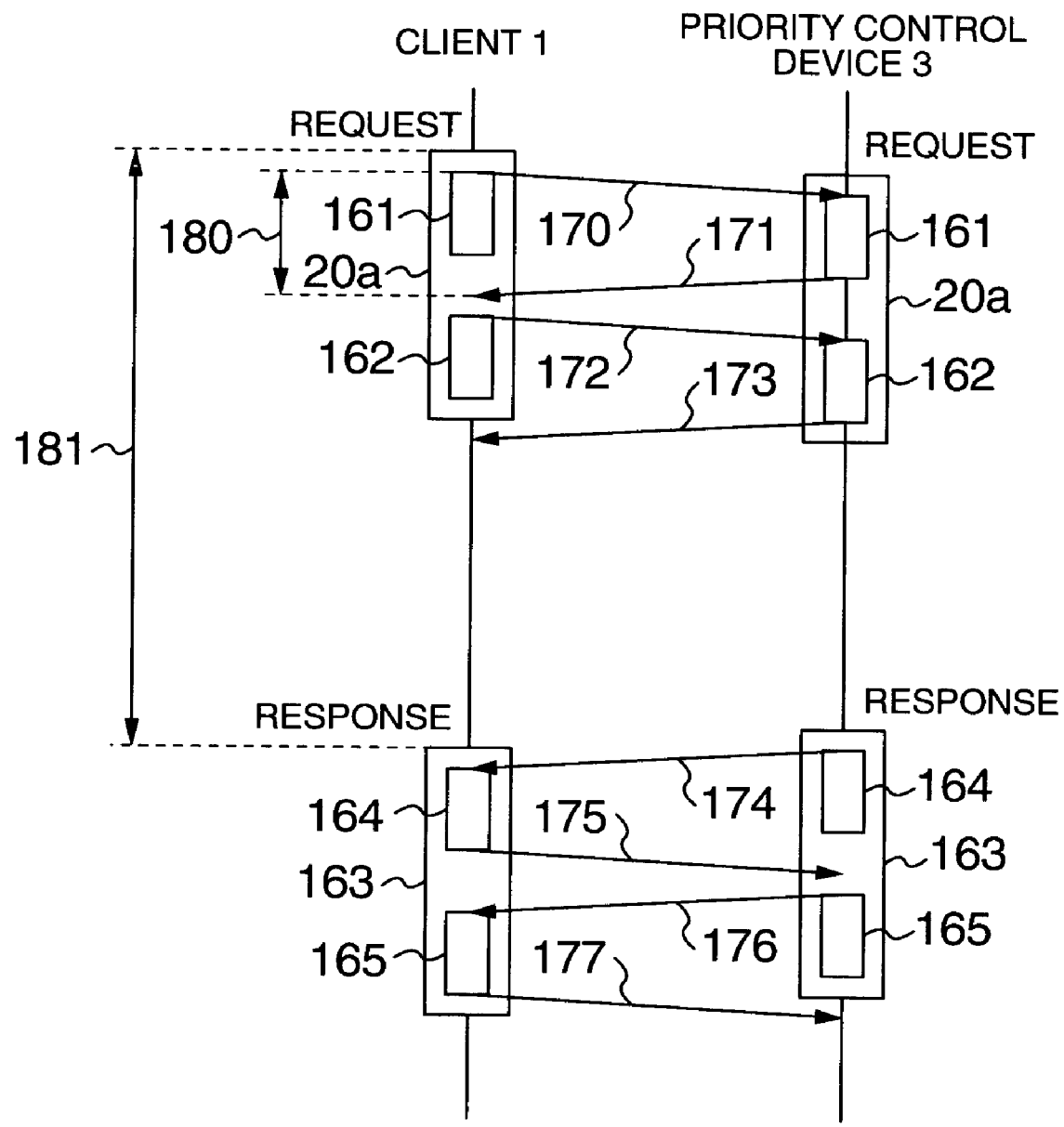
FIG. 8 is a diagram showing a flow of messages transmitted and received between a client 1 and the priority control device 3.

FIG. 8 is a message flow diagram showing request messages and responses associated with the request messages transmitted and received between a client 1 and the priority control device 3.

The request message 20a from the client 1 is divided into a plurality of IP packets such as a packet 161 and a packet 162 on the IP network 2, for transmission. First, the client 1 transmits the IP packet 161 to the priority control device 3 as indicated by an arrow 170. Then, the priority control device 3 transmits to the client 1 a response IP packet indicating that the IP packet 161 has been received, as indicated by an arrow 171. The client 1 waits for arrival of the response IP packet transmitted as indicated by the arrow 171, and upon receipt of the response IP packet, transmits the subsequent IP packet 162, as indicated by an arrow 172. The client 1 waits for arrival of the response IP packet transmitted as indicated by the arrow 171 for a time period 180 of several minutes, defined in the TCP/IP communication procedure, after transmitting the IP packet 161.

On contrast therewith, a response 163 for the request message 20a is divided into IP packets 164 and 165, and transmitted from the priority control device 3 to the client 1. The client 1 waits for arrival of the response 163 for a time period 181, after transmitting the request message 20a.

Though the time period 181 is determined by the protocol used for the request message 20a, it is sufficiently longer than the time period 180, in general. The priority control device 3 receives the request message and temporarily terminates its protocol processing, thereby preventing the time period 180 from exceeding the time period defined in the TCP/IP communication procedure. Further, the priority control device 3 uses the protocol type 112 listed in the delivery rule table 14 for the received request message 20a to determine whether priority control on the request message 20a can be performed using the time period 181 as well as the time period 180. With these arrangements, the priority control device 3 can schedule delivery of request messages at a time interval longer than with the prior art. Thus, the network system can be made ready for use even at the time of overload on the Web service server device, which continues for a long period of time.

The specification and drawings are, accordingly, to be regarded in an illustrative rather than a restrictive sense. It will, however, be evident that various modifications and changes may be made thereto without departing from the spirit and scope of the invention as set forth in the claims.

The invention claimed is:

1. A priority control device coupled to clients and a server through a TCP/IP communication network, for performing communication via a plurality of communication protocols at a protocol layer 4, comprising:
   a unit for receiving request messages at the protocol layer 4 sent from the clients;
   a unit for storing priority control rules that define a priority protocol type including a protocol used for the request message and an allowable delay time allowed for transmission of the request message to the server;
   a unit for prioritizing the request message by analyzing the request message via referring to the priority control rules so that the protocol included in the request message matches with that of the priority control rule, and so that the allowable delay time is taken into consideration for prioritizing; and
   a processing unit for transmitting the request messages to the server in an order of priorities of the request messages according to determination by the prioritizing unit and receiving from the server response messages for the request messages and then transmitting the response messages to the clients.

2. The priority control device according to claim 1, wherein the unit for receiving the request messages from the clients comprises:
   means for receiving IP packets comprising each of the request messages and identifying one of the communication protocols at the protocol layer 4 used for said each of the request messages from the received IP packets;
   means for assembling said each of the request messages from the received IP packets, using a procedure defined in advance for the identified one of the protocols; and
   means for notifying the clients of receipt of the request messages by the priority control device.

3. The priority control device according to claim 1, wherein the unit for prioritizing the request messages comprises means for giving a higher priority to the request message having a holding time limit closer to a time of receiving the request messages from the clients, the holding time limit being determined from the maximum allowable delay time and the time of receiving the request messages.

4. The priority control device according to claim 1, wherein the unit for prioritizing the request messages comprises:
   means for prioritizing a plurality of request messages using different types of the communication protocols, without depending on the different types of the communication protocols.

5. The priority control device according to claim 1, wherein the unit for prioritizing the request messages comprises:
   means for using types of the communication protocols used for the request messages as keys.

6. The priority control device according to claim 1, further comprising:
   means for obtaining respective loads on a plurality of servers; and
   means for determining the servers for transmitting the request messages, respectively, in view of the obtained respective loads on the servers.

7. The priority control device according to claim 2, wherein the means for assembling said each of the request messages from the received IP packets comprises:
- means for assembling said each of the request messages employing an HTTP protocol as said one of the communication protocols; and
- means for assembling the said each of the request messages employing an SMTP protocol as said one of the communication protocols.

8. The priority control device according to claim 1, wherein the unit for prioritizing the request messages comprises:
- means for performing syntactic analyses on the request messages when a structure of the request messages is a syntax type; and
- means for prioritizing the request messages using results of the syntactic analyses.

9. The priority control device according to claim 1, wherein the unit for prioritizing the request messages comprises:
- means for checking whether a determined holding time limit for each of the request messages is passed, and discarding the request message with the determined holding time limit thereof passed.

10. A priority control device coupled to clients and a server through a TCP/IP communication network for performing communication via a plurality of communication protocols at a protocol layer 4, comprising:
- a unit for receiving request messages at the protocol layer 4 sent from the clients;
- a unit for storing priority control rules defining priority for each type of protocol used for transmitting the request messages;
- a unit for prioritizing a request message by analyzing the request message via the priority control rules, determining a first priority with a protocol matching to a protocol of each the request message, and determining a second priority to the request message with the first priority determined by calculating an allowable delay time;
- a buffer for storing the request message of which the second priority was determined by the prioritizing unit;
- a processing unit for transmitting the request messages stored in the buffer to the server in the order of the second priorities of the request messages, receiving from the server response messages for the request messages, and then transmitting the response messages to the clients.

11. The priority control device according to claim 10, wherein the unit for storing priority control rules holds the request messages up to a maximum allowable delay time defined in advance in the rule when the request messages are transmitted to the server; and
- wherein the priority unit determines the second priority by giving a higher priority to the request message having a holding time limit closer to a time of receiving the request messages from the clients, the holding time limit being determined from the maximum allowable delay time and the time of receiving the request messages.

12. The priority control device according to claim 10, wherein said storing unit stores a delivery rule table managing the priority control rules that include entries for each protocol, each entry being constituted from a delivery rule identifier, priority keyword, a priority protocol type, a maximum allowable delay time, an allowable server load and delivery destination server address.

13. The priority control device according to claim 10, wherein said buffer stores the request message with a protocol type, a current time when the request message was received and an allowable delay time calculated by the prioritizing unit.

14. A priority control method for providing a request message sent from a client with a priority to transmit the request message to a server through a TCP/IP communication network via a plurality of communication protocols at a protocol layer 4, comprising:
- receiving request messages at the protocol layer 4 sent from the clients;
- storing priority control rules that define a priority protocol type including a protocol used for the request message and an allowable delay time allowed for transmission of the request message to the server;
- prioritizing the request message by analyzing the request message together with referring to the priority control rules so that the protocol Included in the request message matches with that of the priority control rule, and so that the allowable delay time is taken into consideration for prioritizing;
- transmitting the request messages to the server in an order of priorities of the request messages resulting from the prioritizing; and
- receiving from the server response messages for the request messages and then transmitting the response messages to the clients.

15. The priority control method according to claim 14, wherein the prioritizing the request messages, gives a higher priority to the request message having a holding time limit closer to a time of receiving the request messages from the clients, the holding time limit being determined from the maximum allowable delay time and the time of receiving the request messages.

16. The priority control method according to claim 14, wherein the prioritizing the request messages, prioritizes a plurality of request messages using different types of the communication protocols, without depending on the different types of the communication protocols.

17. The priority control method according to claim 14, wherein said storing priority control rules, stores a delivery rule table managing the priority control rules that include entries for each protocol, each entry being constituted from a delivery rule identifier, priority keyword, a priority protocol type, a maximum allowable delay time, an allowable server load and delivery destination server address.

18. The priority control method according to claim 14, wherein the prioritizing stores the request message with a protocol type, a current time when the request message was received and an allowable delay time calculated by the prioritizing.

* * * * *